United States Patent
Conroy et al.

(10) Patent No.: US 10,475,160 B1
(45) Date of Patent: Nov. 12, 2019

(54) IMAGE MAGNIFICATION SYSTEM

(71) Applicant: CAPTUREPROOF, Inc., San Francisco, CA (US)

(72) Inventors: Meghan Conroy, San Francisco, CA (US); Sabrina Patel, San Francisco, CA (US)

(73) Assignee: CAPTUREPROOF, INC., San Francisco, CA (US)

( * ) Notice: Subject to any disclaimer, the term of this patent is extended or adjusted under 35 U.S.C. 154(b) by 0 days.

(21) Appl. No.: 15/247,428

(22) Filed: Aug. 25, 2016

Related U.S. Application Data

(60) Provisional application No. 62/184,849, filed on Jun. 25, 2015.

(51) Int. Cl.
  *G06T 3/40* (2006.01)
  *G06T 7/00* (2017.01)
  *G06T 7/73* (2017.01)

(52) U.S. Cl.
  CPC .......... *G06T 3/4038* (2013.01); *G06T 7/0014* (2013.01); *G06T 7/0002* (2013.01); *G06T 7/0004* (2013.01); *G06T 7/74* (2017.01)

(58) Field of Classification Search
  None
  See application file for complete search history.

(56) References Cited

U.S. PATENT DOCUMENTS

| | | | | |
|---|---|---|---|---|
| 7,762,946 B2* | 7/2010 | Sugimoto | ............ | A61B 1/0005 348/65 |
| 2007/0109324 A1* | 5/2007 | Lin | ...................... | H04N 5/4403 345/671 |
| 2007/0127791 A1* | 6/2007 | Ernvik | ..................... | G06T 19/20 382/128 |
| 2010/0002071 A1* | 1/2010 | Ahiska | ................... | H04N 5/217 348/36 |
| 2013/0191767 A1* | 7/2013 | Peters | ................... | G06F 3/0481 715/765 |
| 2014/0380235 A1* | 12/2014 | Kusakabe | ............. | G06F 3/0485 715/799 |
| 2014/0380237 A1* | 12/2014 | Kroupa | ................. | G06F 3/0483 715/803 |

(Continued)

*Primary Examiner* — Xiao M Wu
*Assistant Examiner* — Steven Z Elbinger
(74) *Attorney, Agent, or Firm* — Robert Crownover

(57) ABSTRACT

A method and apparatus can include: displaying original images, the original images including a first original image and a second original image; displaying magnification regions overlaid on top of the original images; detecting a positioning user input, the positioning user input identifying first coordinates for a first center point of a first magnification region; calculating second coordinates for a second center point of a second magnification region based on a linear relationship between the location of the first center point within the first original image and the location of the second center point within the second original image; displaying the second magnification region overlaid on the second original image and the second magnification region having the second center point based on the linear relationship; and displaying magnified images including a first magnified image corresponding to the first magnification region and a second magnified image corresponding to the second magnification region.

20 Claims, 7 Drawing Sheets

(56) References Cited

U.S. PATENT DOCUMENTS

| 2015/0178953 A1* | 6/2015 | Gao | G06F 17/2765 |
| | | | 345/681 |
| 2015/0253407 A1* | 9/2015 | Nitta | G01R 33/4822 |
| | | | 382/131 |
| 2015/0356245 A1* | 12/2015 | Kozuka | G06F 19/321 |
| | | | 705/2 |

* cited by examiner

IMAGE MAGNIFICATION SYSTEM

CROSS-REFERENCE TO RELATED APPLICATION(S)

This claims priority benefit to all common subject matter of U.S. Provisional Patent Application 62/184,849 titled Image with Synchronized Dual Magnification and Analysis with and without Context, and filed Jun. 25, 2015. The content of this application is incorporated herein by reference.

TECHNICAL FIELD

This disclosure relates to electronic image technologies, more particularly to manipulating multiple images simultaneously.

BACKGROUND

In recent times, imaging technology has advanced with a tremendous pace. The rapidly growing portable electronics market, e.g. cellular phones, tablet computers, and PDAs, are an integral facet of modern life and has made imaging technologies ubiquitous and readily available.

Together with the development and supply of imaging technology, a need to utilize these low cost readily available imaging technology for analysis, diagnostics, and comparison purposes has arisen. Many fields have discovered a need for clear, accurate, consistently arranged, and time variant images. These fields cover wide implementation areas including construction management, insurance, and medicine.

In one example, external visual imaging techniques have long been an integral part of diagnosing and treating patient ailments. Some medical arts such as plastic surgery rely almost exclusively on visual end points and imaging.

Illustratively, scars and their healing are often characterized through a doctor's visual analysis of the patient's skin. A doctor monitoring the healing of a scar is primarily concerned with the size, shape and visibility of the scar at a given time as well as how the size, shape, color, and visibility of the scar are changing over time. Being able to review close up images, in greater detail, of the subject or relevant area are of equal importance.

Further, in the cosmetics industry, research scientists must visually study how make-up, creams (e.g. wrinkle and cellulite treatments), and other products affect the appearance of subjects over a course of treatment.

Yet further, pharmaceutical researchers involved in clinical trials must visually study experimental topical therapeutics to determine the efficacy of such therapeutics on patients suffering from various skin ailments. The results of such visual studies are then used to support regulatory filings with the goal of having such therapeutics approved for sale to consumers.

Since external visual imaging in the medical arts is concerned with the appearance and presentation of how certain structures on the human body are visually changing over time, both still and motion photography are vital tools for image acquisition, storage and analysis. There is a clear need to have appropriate tools to then analyze these images to look for changes and or structures that were not viewable upon first glance but merit closer analysis. However, the use of still and motion photography in the medical arts presents a unique set of challenges.

A primary challenge inherent in the use of still and motion photography is this inability to gain a closer analysis of images. While a still or motion image may provide information—often the ability to truly see change and make diagnoses may require the ability to more closely view an image in greater detail. When patients send and/or share images with their practitioner or any other healthcare professional, they lack the ability to know exactly what their practitioner will be focusing on in the image they send of themselves.

The common trait of these prior developments is the high level of training, skill, and work required to interface with the technology, manipulate images, and analyze regions of the images more closely. These prior developments in imaging are therefore expensive and time consuming to use.

Solutions have been long sought but prior developments have not taught or suggested any complete solutions, and solutions to these problems have long eluded those skilled in the art. Thus there remains a considerable need for devices and methods that can provide fast and intuitive image manipulation at a lower price point.

SUMMARY

A magnification system and methods, providing significantly faster and more intuitive image manipulation at a lower price point, are disclosed. The magnification system and methods can include: displaying original images, the original images including a first original image and a second original image, the original images being visual depictions of a physical object based on raw data collected from an image sensor, the original images being displayed on a display; displaying magnification regions overlaid on top of the original images, the magnification regions including a first magnification region displayed overlaid on top of the first original image and having a first outline and a first center point, and the magnification regions including a second magnification region displayed overlaid on top of the second original image and having a second outline and a second center point; detecting a positioning user input, the positioning user input identifying first coordinates for the first center point; calculating second coordinates for the second center point based on a linear relationship between the location of the first center point within the first original image and the location of the second center point within the second original image; displaying the second magnification region overlaid on the second original image and the second magnification region having the second center point based on the linear relationship; and displaying magnified images including a first magnified image corresponding to the first magnification region and a second magnified image corresponding to the second magnification region.

Other contemplated embodiments can include objects, features, aspects, and advantages in addition to or in place of those mentioned above. These objects, features, aspects, and advantages of the embodiments will become more apparent from the following detailed description, along with the accompanying drawings.

BRIEF DESCRIPTION OF THE DRAWINGS

The magnification system is illustrated in the figures of the accompanying drawings which are meant to be exemplary and not limiting, in which like reference numerals are intended to refer to like components, and in which.

DETAILED DESCRIPTION

Figure 1:
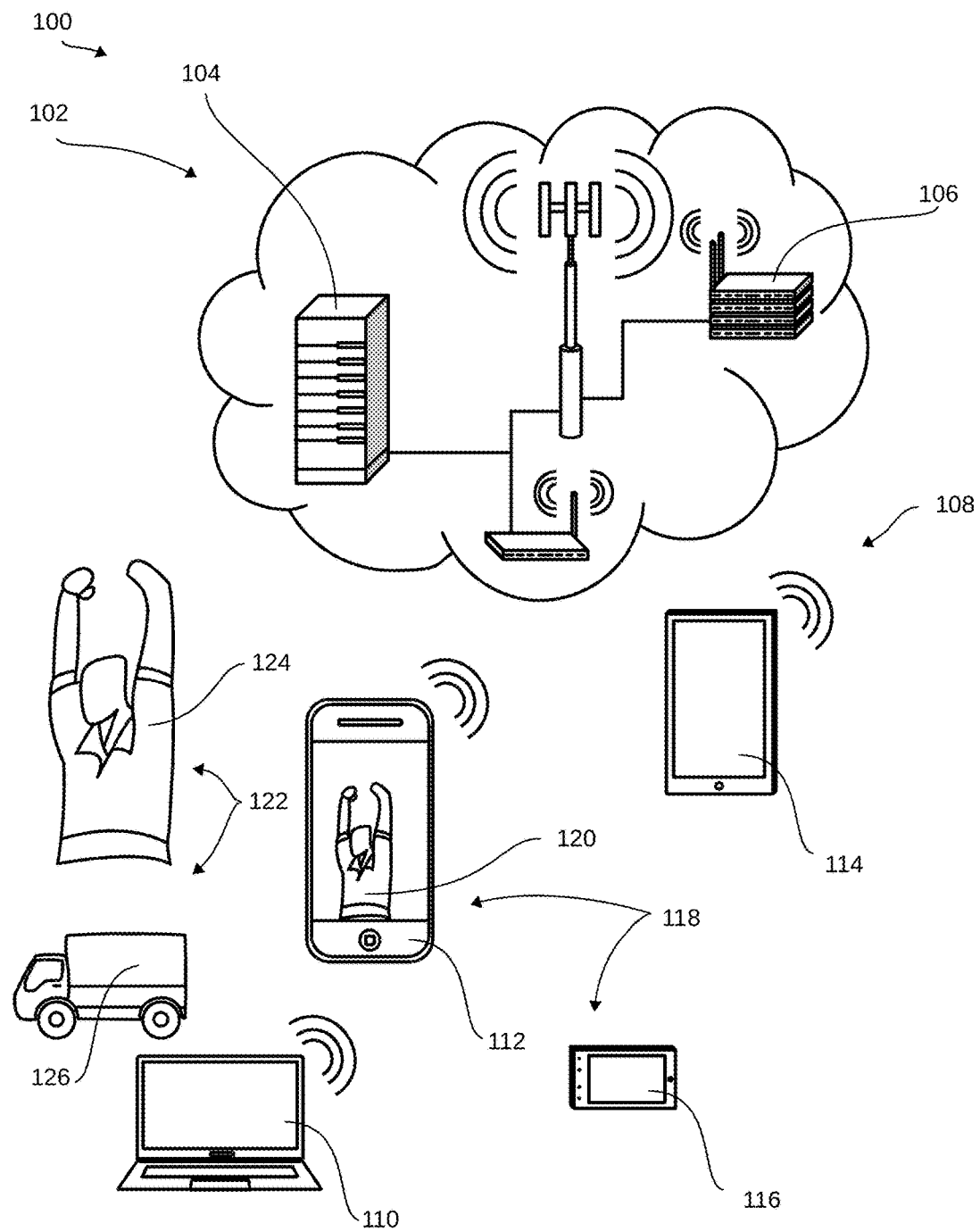
FIG. 1 is a block diagram of the magnification system.

In the following description, reference is made to the accompanying drawings that form a part hereof, and in which are shown by way of illustration, embodiments in which the magnification system may be practiced. It is to be understood that other embodiments may be utilized and structural changes may be made without departing from the scope of the magnification system.

When features, aspects, or embodiments of the magnification system are described in terms of steps of a process, an operation, a control flow, or a flow chart, it is to be understood that the steps can be combined, performed in a different order, deleted, or include additional steps without departing from the magnification system as described herein.

It further to be understood that when the magnification system is described in terms of method steps for operating the magnification system, the steps are performed on a physical integrated circuit processor or processors with information being stored in non-transitory computer readable medium. When describing images, it is to be understood that the images are displayed on a physical computerized display.

The magnification system is described in sufficient detail to enable those skilled in the art to make and use the magnification system and provide numerous specific details to give a thorough understanding of the magnification system; however, it will be apparent that the magnification system may be practiced without these specific details.

In order to avoid obscuring the magnification system, some well-known system configurations are not disclosed in detail. Likewise, the drawings showing embodiments of the system are semi-diagrammatic and not to scale and, particularly, some of the dimensions are for the clarity of presentation and are shown greatly exaggerated in the drawing FIGs. Generally, the magnification system can be operated in any orientation.

As used herein, the term system is defined as a device or method depending on the context in which it is used. The term image is generally used herein to describe a still image for descriptive clarity; however, the term image is intended to encompass a series of images as is found in a video or an image and changes thereto as is found in a compressed or encoded video.

Referring now to FIG. 1, therein is shown a block diagram of the magnification system 100. The magnification system 100 can include elements of a distributed computing system 102 including servers 104, routers 106, and other telecommunications infrastructure.

The distributed computing system 102 can include the Internet, a wide area network (WAN), a metropolitan area network (MAN), a local area network (LAN), a telephone network, cellular data network (e.g., 3G, 4G) and/or a combination of these and other networks (wired, wireless, public, private or otherwise).

The servers 104 can function both to process and store data for use on user devices 108 including laptops 110, cellular phones 112, and tablet computers 114, and cameras 116. It is contemplated that the servers 104 and the user devices 108 can individually comprise a central processing unit, memory, storage and input/output units and other constituent components configured to execute applications including software suitable for displaying user interfaces, the interfaces optionally being generated by a remote server, interfacing with the cloud network, and managing or performing capture, transmission, storage, analysis, display, or other processing of data and or images.

The servers 104 and the user devices 108 of the magnification system 100 can further include a web browser operative for, by way of example, retrieving web pages or other markup language streams, presenting those pages or streams, executing scripts, controls and other code on those pages or streams, accepting user input with respect to those pages or streams, and issuing HTTP requests with respect to those pages or streams. The web pages or other markup language can be in HAML, CSS, HTML, Ruby on Rails or other conventional forms, including embedded XML, scripts, controls, and so forth as adapted in accord with the teachings hereof. The user devices 108 and the servers 104 can be used individually or in combination to store and process information from the magnification system 100 in the form of operation method steps such as detecting steps, calculating steps, and displaying steps.

The user devices 108 can also be image-capturing devices 118, such as the cellular phone 112, the camera 116, the laptop 110, or the tablet computer 114. It is contemplated that the image-capturing device 118 can be any device suitable for acquiring images and communicating the images to the distributed computing system 102.

The image-capturing devices 118 can be used to capture and display original images 120 of a subject 122. It is contemplated that the subject 122 can be people 124, objects 126, pictorial representations such as photographs or drawings, and models. The object 126 is depicted as a vehicle useful for example in the insurance industry.

Figure 2:
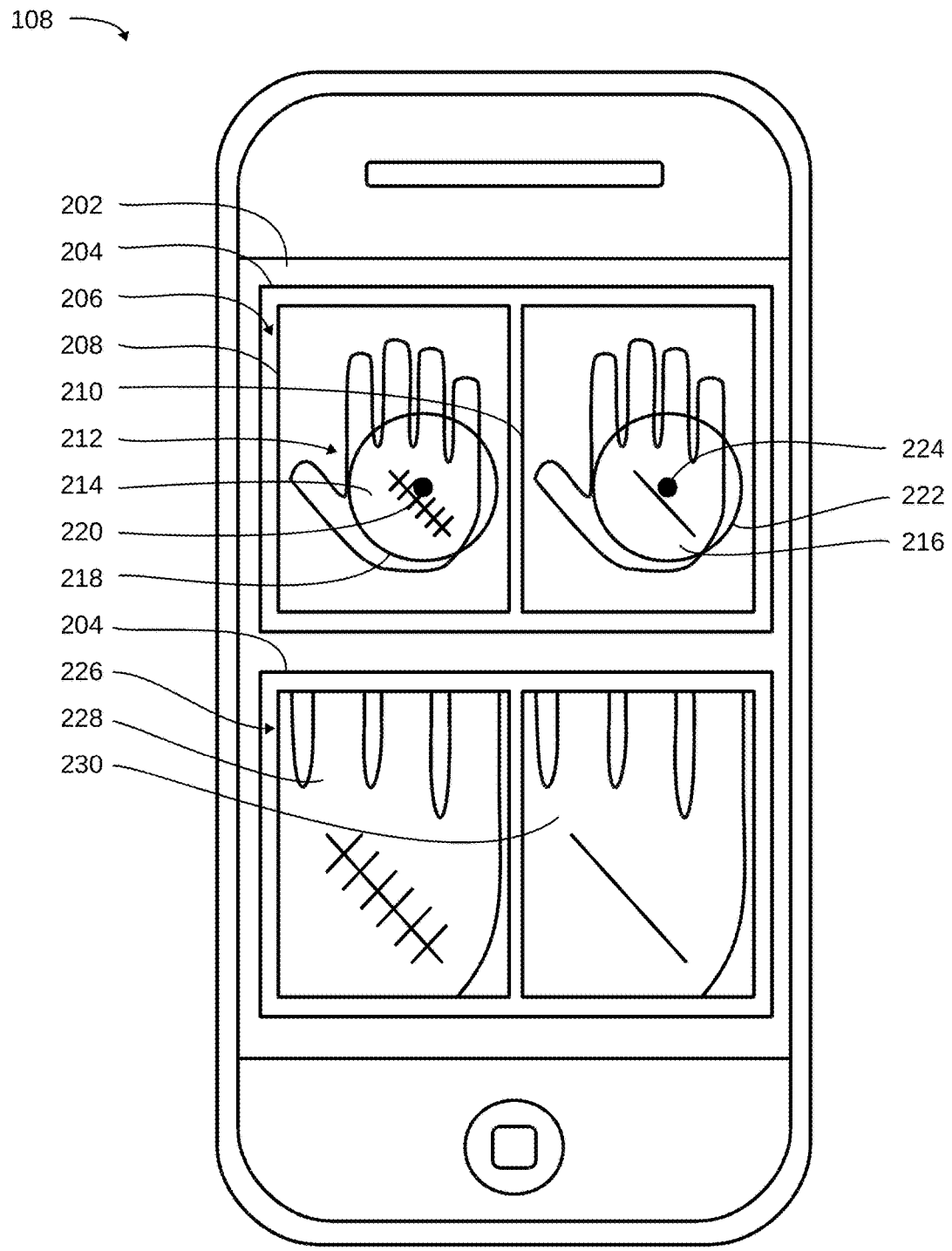
FIG. 2 is a front side view of the user device of FIG. 1.

Referring now to FIG. 2, therein is shown a front side view of the user device 108 of FIG. 1. The user device 108 is contemplated to be both the image-capturing device 118 of FIG. 1 and the cellular phone 112 of FIG. 1.

The user device 108 is depicted having a display 202. The display 202 is contemplated to be a physical screen.

The display 202 is shown having viewing areas 204. Within the viewing areas 204, the user device 108 is shown displaying original images 206.

The original images 206 can include a first original image 208 and a second original image 210. The original images 206 are contemplated to be visual depictions of a physical object based on raw data collected from an image sensor within the user device 108.

Illustratively, the original images 206 are shown to be a hand at two different points in time. The first original image 208 is a hand having a wound at an early stage healing while the second original image 210 is the hand with the wound shown at a more advanced stage of healing.

It is contemplated that the original images 206 can be arranged in other ways such as with the first original image 208 on the left and the second original image 210 on the right. Alternatively, it is contemplated that the original images 206 could be displayed vertically offset from one another.

Overlaid on each of the original images 206 are magnification regions 212. The magnification regions 212 include a first magnification region 214 overlaid on the first original image 208 and a second magnification region 216 overlaid on the second original image 210.

The first magnification region 214 is shown having a first outline 218 and a first center point 220 while the second magnification region 216 is shown having a second outline 222 and a second center point 224.

The magnification regions 212 are depicted being circular, however any geometric shape is contemplated including squares, rectangles, and ellipses. The first center point 220 is the middle or the center of the first magnification region 214 which can be calculated by finding the half way point between the right and left side of the first magnification region 214 and the half way point between the top and bottom of the first magnification region 214.

The second center point 224 is the middle or the center of the second magnification region 216 which can be calculated by finding the half way point between the right and left side of the second magnification region 216 and the half way point between the top and bottom of the second magnification region 216. The first center point 220 can be a Cartesian coordinate point within the first original image 208.

It is contemplated that the first original image 208 can be aligned with the bottom left corner at the origin of a Cartesian plane and that the first center point 220 can be described by an X coordinate corresponding to a lateral X-axis and can be further described by a Y coordinate corresponding to a vertical Y-axis. That is, the first center point 220 can be described by the point $(X_1, Y_1)$ within the first original image 208 and it is understood that the first center point 220 includes the inherent feature of a location within the first original image 208.

The second center point 224 can also be a Cartesian coordinate point within the second original image 210. It is contemplated that the second original image 210 can be aligned with the bottom left corner at the origin of a Cartesian plane and that the second center point 224 can be described by an X coordinate corresponding to a lateral X-axis and can be further described by a Y coordinate corresponding to a vertical Y-axis. That is, the second center point 224 can be described by the point $(X_2, Y_2)$ within the second original image 210 and it is understood that the second center point 224 includes the inherent feature of a location within the second original image 210.

It will be appreciated that the first original image 208 and the second original image 210 can be measured on separate independent coordinate systems. The user device 108 can detect user inputs. For example, the display 202 can be a touch sensitive display and can detect selection user inputs, positioning user input, or sizing user inputs. Illustratively, the user device 108 can detect a finger of a user touching the display 202 somewhere on the first original image 208 identifying a location on the first original image 208.

It is contemplated that the positioning user input can be a double tap on the display 202, a click on the display 202, a dragging on the display 202, or simply a single touch on the display 202. It is contemplated that the selection user input can be a single touch or a dragging on the display 202. It is contemplated that the sizing user input can be a swipe on the display 202 or can be a pinch and zoom, such as a pinching together or apart on the display 202.

When the user identifies a location within the first original image 208 or even the second original image 210, the user device 108 can determine that the user input is a positioning user input. A positioning user input on the first original image 208 can be used to calculate the first center point 220 within the first original image 208.

For example, the positioning user input can identify a single location or can identify an area the size of a stylus or a fingertip. The user device 108 can then calculate the first center point 220 to be the center of the area of the positioning user input.

Once the positioning user input is used to calculate the location of the first center point 220 within the first original image 208, the user device 108 can calculate the location of the second center point 224 within the second original image 210.

The location of the second center point 224 can be calculated based on a linear relationship between the location of the first center point 220 within the first original image 208 and the location of the second center point 224 within the second original image 210. In one example, when the original images 206 are the same size, $X_1$ can equal $X_2$ and $Y_1$ can equal $Y_2$.

As can be seen, the first center point 220 of the first magnification region 214 is at the same location relative to the first original image 208 as the second center point 224 of the second magnification region 216 is relative to the second original image 210 and the linear relationship between the location of the first center point 220 and the second center point 224 is 1:1. Alternatively, when the original images 206 are not the same size the second center point 224 can be calculated with a different linear relationship.

Illustratively, $X_2$ can be equal to $X_1$ multiplied by the width of the second original image 210 and divided by the width of the first original image 208 and $Y_2$ can be equal to $Y_1$ multiplied by the height of the second original image 210 and divided by the height of the first original image 208.

In a similar manner, the user device 108 can detect modifying positioning user inputs that modify the position of the first center point 220 within the first original image 208. That is, a user can drag their finger across the first original image 208 to update or modify the positioning user input. As the user enters more positioning user inputs, the location of the first center point 220 will be updated and move along with the finger of the user.

When a modified positioning user input is detected and the new location of the first center point 220 is calculated based on the modified positioning user input, the user device 108 will again calculate the location of the second center point 224 based on the linear relationship with the location of the first center point 220. For clarity, the calculations are being described with respect to the second center point 224. However, it will be appreciated that the second center point 224 can be determined by user input and the location of the first center point 220 can be calculated using the linear relationship based on the location of the second center point 224.

That is, the first center point 220 and the second center point 224 are linked and moving one will move the other so that the positioning user input or the modifying positioning user input can be provided on the second original image 210 rather than on the first original image 208. When the positioning user input is detected on the second original image 210, the user device 108 will calculate the location of the second center point 224 in the way described above with regard to the positioning user input detected on the first original image 208. Further, the user device 108 can calculate the location of the first center point 220 in a way described above with regard to the positioning user input detected on the first original image 208.

It has been discovered that detecting the positioning user input, calculating the location of the first center point 220 within the first original image 208 and calculating the location of the second center point 224 within the second original image 210 as described, yields unexpected improvements to imaging technology not of quantitative only but of qualitative improvements to the underlying technologies by reducing processor and memory requirements. Yet further it has been discovered to furnish a revolutionarily intuitive user experience resulting in less training time, faster, and more responsive experience at a lower price point.

The horizontal distance between the first center point 220 and the second center point 224 can further be described as the width of the first original image 208 in addition to the width of a gap separating the first original image 208 from the second original image 210. The display 202 of the user device 108 is depicted with another one of the viewing areas 204 vertically offset below the viewing area 204 containing the original images 206.

Within the second viewing area 204, magnified images 226 are shown arranged horizontally offset. Specifically, the magnified images 226 are shown to be a first magnified image 228 on the left of a second magnified image 230.

The magnified images 226 can be magnified portions of the original images 206 within the or around the magnification regions 212. Specifically, the first magnified image 228 can be a magnified version of the first magnification region 214 while the second magnified image 230 can be a magnified version of the second magnification region 216.

The magnification factors of the magnified images 226 can be 1.5×, 2.0×, 10.0× the areas identified within the magnification regions 212. It is contemplated that the magnified images 226 can be fully contained within the regions of the original images 206 identified by the magnification regions 212.

As can be seen, the magnification regions 212 are circular while the magnified images 226 are rectangular, in this scenario the magnified images 226 can be portions of the original images 206 circumscribed by the magnification regions 212. Alternatively, the magnified images 226 can include portions of the original images 206 not contained within the magnification regions 212.

The user device 108 can further detect a sizing user input on the display 202. The sizing user input can be used by a user to identify the size of the magnification regions 212 and thereby determine how much of the original images 206 is shown magnified in the magnified images 226.

Illustratively, when a user pinches together in one of the original images 206, the magnification regions 212 will be reduced in size in an amount corresponding to the amount of movement and speed of movement during the sizing user input. Conversely, when the sizing user input is a two fingers moving apart, the magnification regions 212 will be expanded in size in an amount corresponding to the amount of movement and speed of movement during the sizing user input.

Once the sizing user input is used to change the size of the magnification regions 212, the area and amount of the original images 206 contained within the magnified images 226 will be recalculated and updated to display the new area of the original images 206 contained within the magnification regions 212.

It is contemplated that the magnified images 226 can have a standard preset amount of magnification such as five times. It is further contemplated that the preset amount of magnification can be set to an individual user's preferences or be based on the size of display of the user device 108.

It has been discovered that detecting the sizing user input, and the preset amount of magnification as described, yields unexpected improvements to imaging technology not of quantitative only but of qualitative improvements to the underlying technologies by reducing processor and memory requirements. Yet further it has been discovered to furnish a revolutionarily intuitive user experience resulting in less training time, faster, and more responsive experience at a lower price point.

Figure 3:
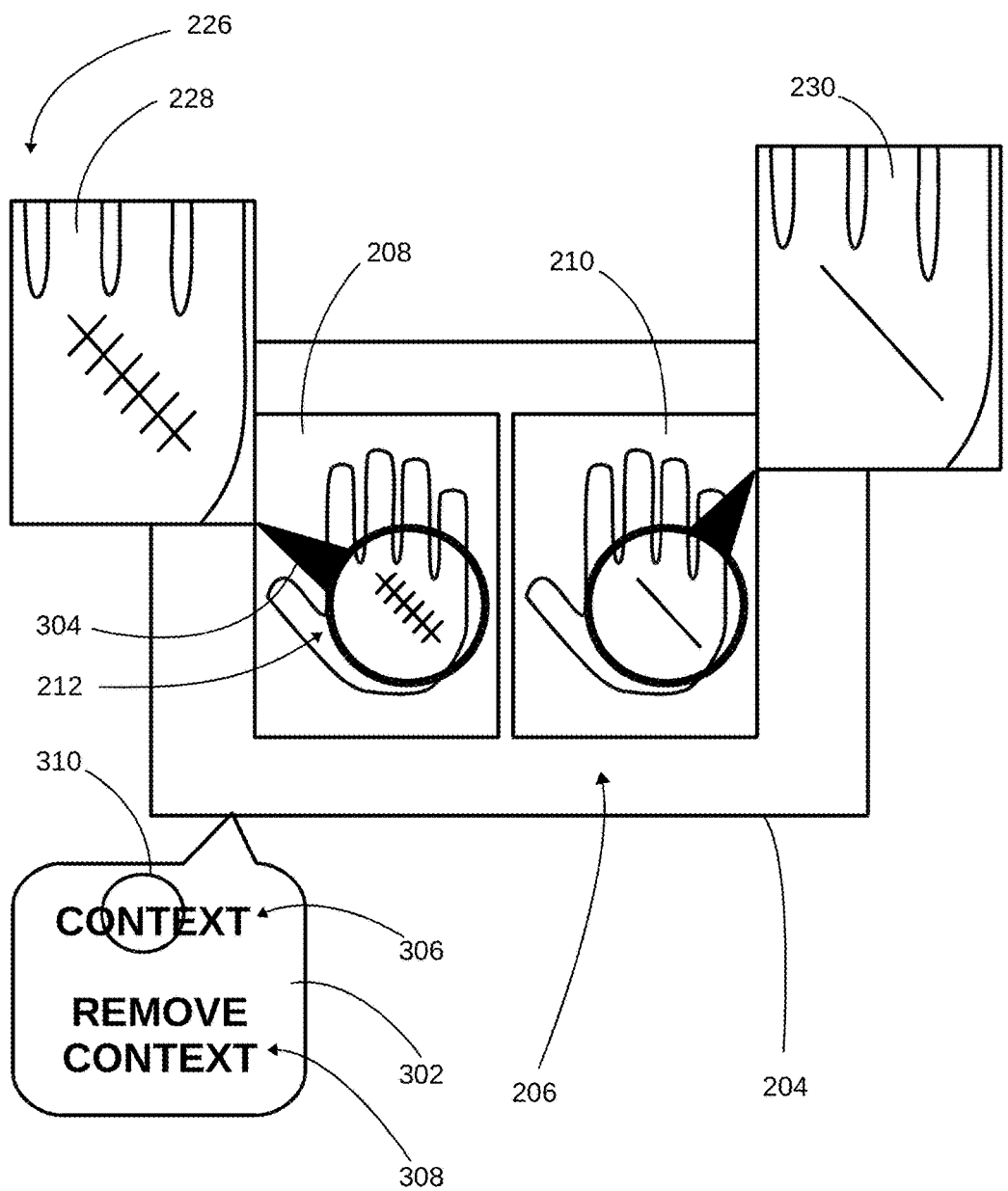
FIG. 3 is a graphical depiction of a context selection menu for the magnified images of FIG. 2 in a context phase of operation.

Referring now to FIG. 3, therein is shown a graphical depiction of a context selection menu 302 for the magnified images 226 of FIG. 2 in a context phase of operation. The original images 206 are depicted within the viewing areas 204 while the magnified images 226 are positioned vertically and horizontally offset from the original images 206.

Illustratively, the first magnified image 228 is shown to the left of and extended above the first original image 208 while the second magnified image 230 is shown to the right of and extended above the second original image 210. The magnification regions 212 are shown having a triangular pointer 304 designating which of the magnified images 226 belong to which of the magnification regions 212.

The triangular pointer 304 can be connected between the corner of the magnified images 226 closest to the magnification regions 212 and the magnification regions 212. It is contemplated that the display 202 of FIG. 2 of the user device 108 of FIG. 1 can detect a repositioning user input for changing the location and display of the magnified images 226. The magnified images 226 can be repositioned within the viewing areas 204 or outside of the viewing areas 204.

The context selection menu 302 can be seen displayed near a lower side of the viewing areas 204 and close to the left corner. The context selection menu 302 can include a context request 306 and remove context request 308.

The user device 108 can detect a selection user input 310 corresponding to either the context request 306 or the remove context request 308. The selection user input 310 can be a tap or double tap by the user on the display 202 near the location of either the context request 306 or the remove context request 308.

As will be appreciated, when the selection user input 310 corresponds to the context request 306, the user device 108 will display portions of the original images 206 together with the magnified images 226. The portions of the original images 206 can be areas immediately around the magnification regions 212 or can include the full original images 206.

It has been discovered that detecting the selection user input 310, and displaying the original images 206 together with the magnified images 226 as described, yields unexpected improvements to imaging technology not of quantitative only but of qualitative improvements to the underlying technologies by reducing processor and memory requirements. Yet further it has been discovered to furnish a revolutionarily intuitive user experience resulting in less training time, faster, and more responsive experience at a lower price point.

Figure 4:
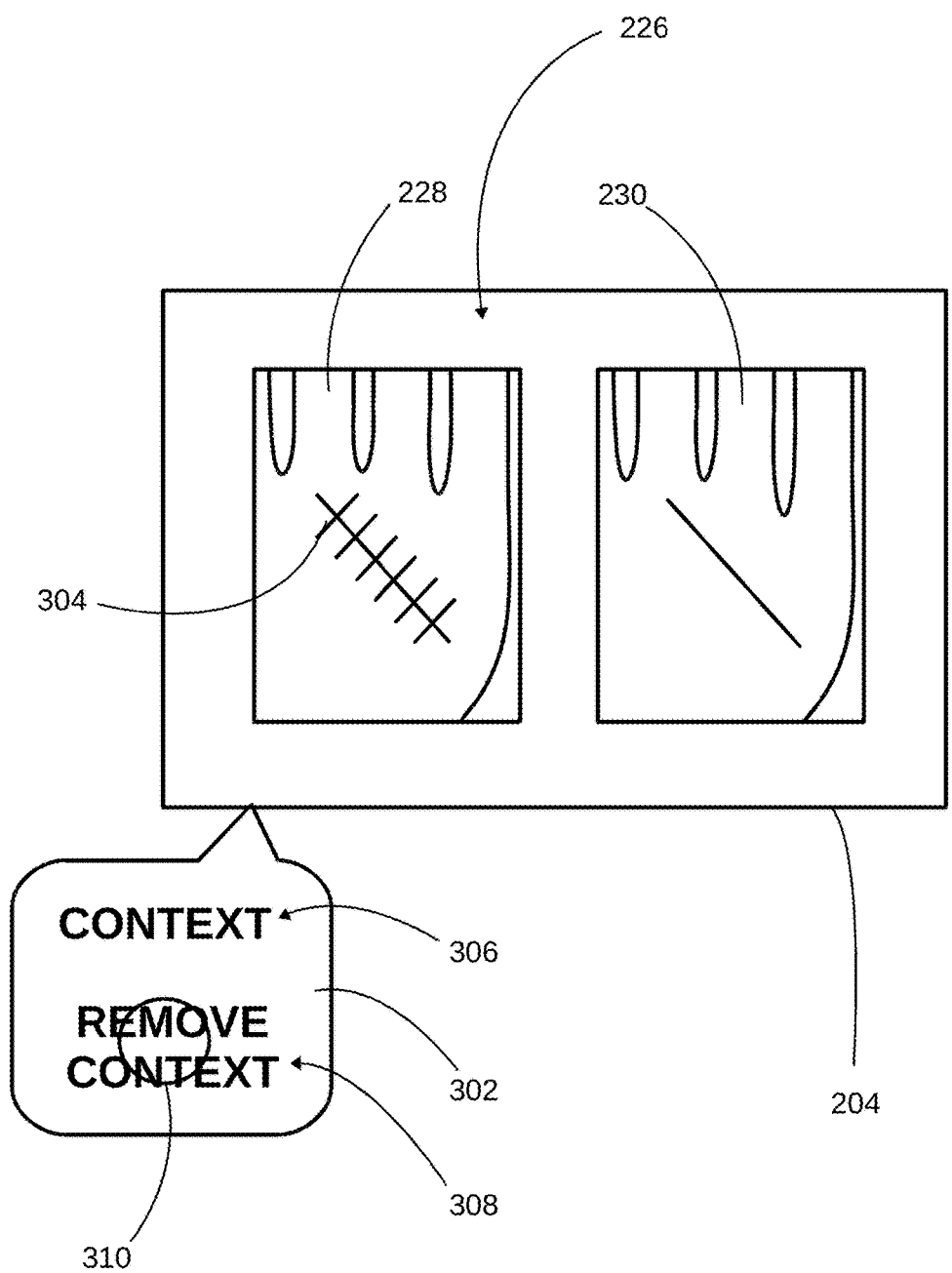
FIG. 4 is a graphical depiction of a context selection menu for the magnified images of FIG. 2 in a context removal phase of operation.

Referring now to FIG. 4, therein is shown a graphical depiction of the context selection menu 302 for the magnified images 226 of FIG. 2 in a context removal phase of operation. The user device 108 of FIG. 1 can detect the selection user input 310 corresponding to either the context request 306 or the remove context request 308. The selection user input 310 can be a tap or double tap by the user on the display 202 of FIG. 2 near the location of either the context request 306 or the remove context request 308.

As will be appreciated, when the selection user input 310 corresponds to the remove context request 308, the user device 108 will remove the original images 206 of FIG. 2 from the display 202 and will only display the magnified images 226. As can be seen, when the remove context request 308 is selected by the user, the magnification regions 212 are also not displayed. Further, when the remove context request 308 is selected the magnified images 226 can be repositioned within the viewing areas 204 in order to provide a better viewing arrangement.

It has been discovered that detecting the selection user input 310 and displaying only the magnified images 226 as described, yields unexpected improvements to imaging technology not of quantitative only but of qualitative improvements to the underlying technologies by reducing processor and memory requirements. Yet further it has been discovered to furnish a revolutionarily intuitive user experience resulting in less training time, faster, and more responsive experience at a lower price point.

Figure 5:
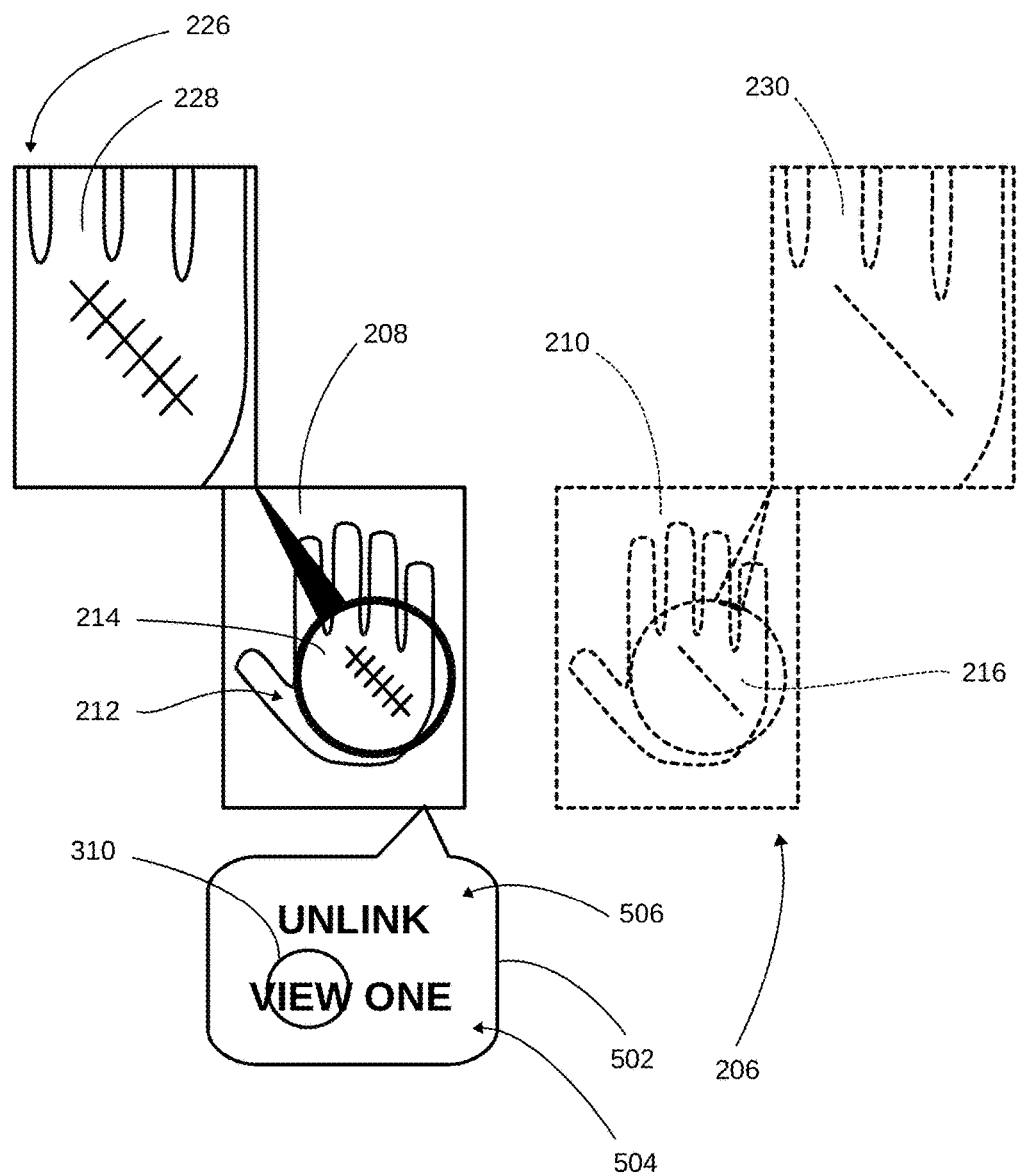
FIG. 5 is a graphical depiction of a view selection menu for the magnified images and the original images of FIG. 2 in a singular view phase of operation.

Referring now to FIG. 5, therein is shown a graphical depiction of a view selection menu 502 for the magnified images 226 and the original images 206 of FIG. 2 in a singular view phase of operation. The view selection menu 502 can be seen displayed on the display 202 of FIG. 2 and can include a singular view request 504 and an unlink request 506.

The view selection menu 502 can be seen displayed pointing to one of the original images 206. Illustratively, the view selection menu 502 is shown underneath and pointing to the first original image 208. When the selection user input 310 is detected by the display 202 corresponding the singular view request 504, the original images 206 pointed to by the view selection menu 502 will be displayed with the corresponding magnification regions 212 and magnified images 226 while the other original images 206 will not be displayed.

As can be seen, the view selection menu 502 is positioned below the first original image 208 and designates or points to the first original image 208. The selection user input 310 is shown corresponding to the singular view request 504 and the first original image 208, the first magnification region 214, and the first magnified image 228 are shown being displayed.

Simultaneously, the second original image 210, the second magnification region 216, and the second magnified image 230 are shown with broken lines indicating that they have been removed and are not displayed on the display 202.

It has been discovered that detecting the selection user input 310 and displaying only one of the original images 206 together with the corresponding magnified images 226 as described, yields unexpected improvements to imaging technology not of quantitative only but of qualitative improvements to the underlying technologies by reducing processor and memory requirements. Yet further it has been discovered to furnish a revolutionarily intuitive user experience resulting in less training time, faster, and more responsive experience at a lower price point.

Figure 6:
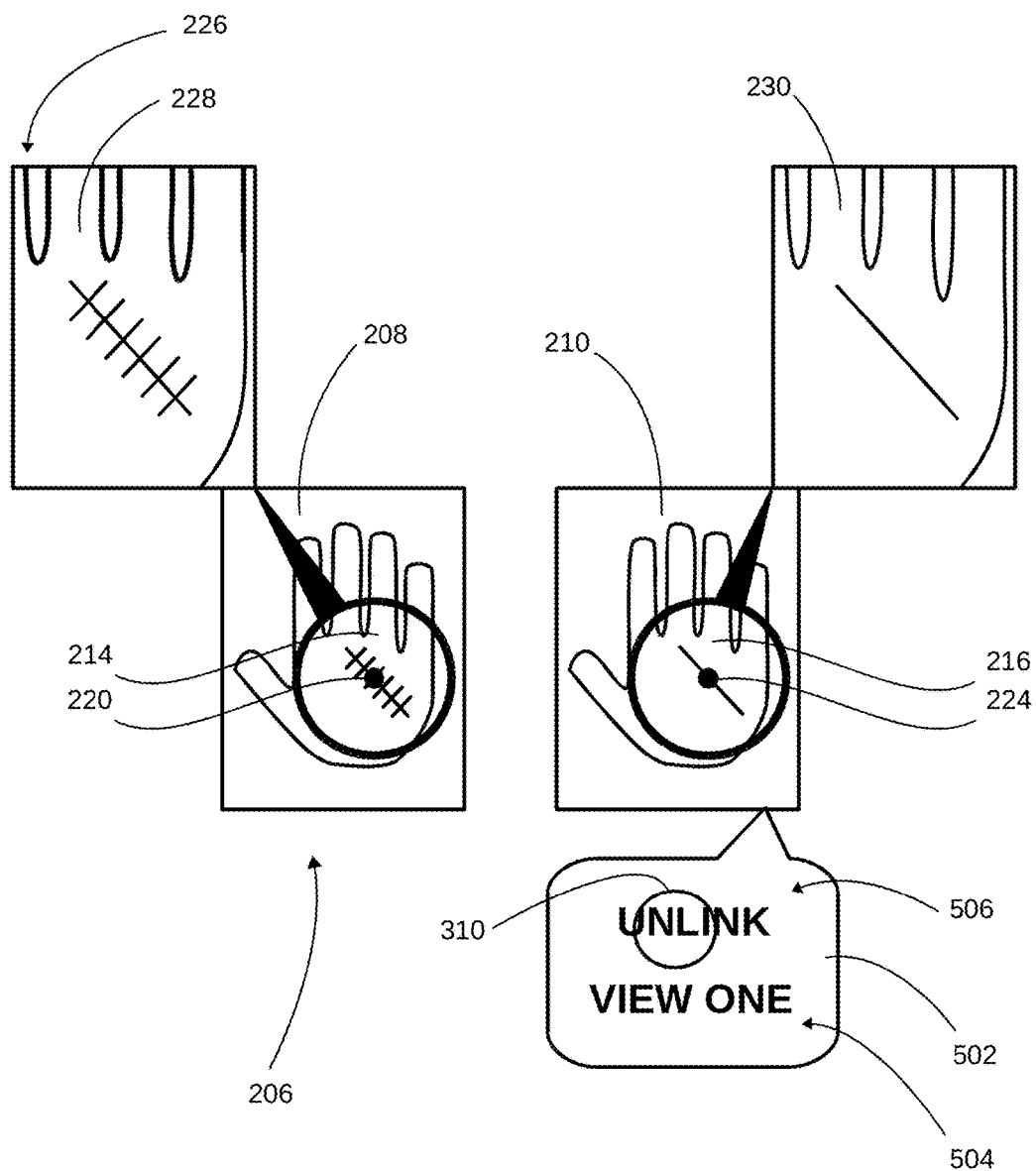
FIG. 6 is a graphical depiction of a view selection menu for the magnified images and the original images of FIG. 2 in an unlink phase of operation.

Referring now to FIG. 6, therein is shown a graphical depiction of the view selection menu 502 for the magnified images 226 and the original images 206 of FIG. 2 in an unlink phase of operation.

The view selection menu 502 can be seen displayed on the display 202 of FIG. 2 and can include a singular view request 504 and an unlink request 506.

The view selection menu 502 can be seen displayed pointing to one of the original images 206. Illustratively, the view selection menu 502 is shown underneath and pointing to the second original image 210. When the selection user input 310 is detected by the display 202 corresponding the unlink request 506, the first center point 220 of the first magnification region 214 and the second center point 224 of the second magnification region 216 will be moveable independently.

Further, when the selection user input 310 is detected by the display 202 corresponding the unlink request 506, the location of the other center point will not be calculated based on the linear relationship described above with regard to FIG. 2 but instead will be determined by independent and different positioning user inputs for each of the first center point 220 and the second center point 224.

It is further contemplated that when the selection user input 310 corresponding to a link request is subsequently detected, the center points will be linked and the location of the center points will be calculated based on the linear relationship described above with regard to FIG. 2.

It has been discovered that detecting the selection user input 310 and allowing the magnification regions 212 overlaid on both original images 206 to move separately without being linked and without requiring a linear relationship between the location of the magnification regions 212 as described, yields unexpected improvements to imaging technology not of quantitative only but of qualitative improvements to the underlying technologies by reducing processor and memory requirements. Yet further it has been discovered to furnish a revolutionarily intuitive user experience resulting in less training time, faster, and more responsive experience at a lower price point.

Figure 7:
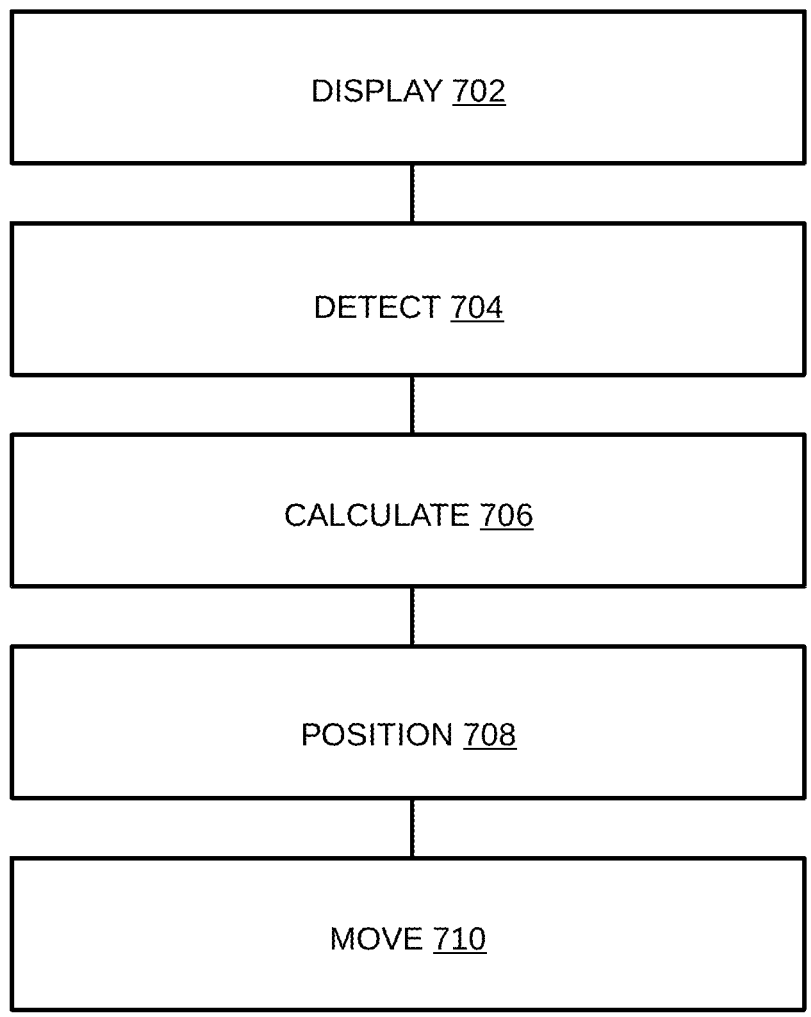
FIG. 7 is a control flow for the operation of the magnification system.

Referring now to FIG. 7, therein is shown a control flow of operation for an embodiment of the magnification system 100 of FIG. 1. A display step 702 can be executed by a processor of the magnification system 100. The display step 702 can include pulling images from memory of the magnification system 100 or acquiring images from image sensors of the magnification system 100.

The display step 702 can further include formatting the images with a predefined width and height for display and displaying the images in a preconfigured location and having a gap between images. The images can be the original images 206 of FIG. 2.

The height of the images, the width of the images, the location of the images, and the gap between the images can be determined by the size of the display 202 of FIG. 2 used in the display, the size and shape of the original images 206, or the user's previous settings. During the display step 702 the magnification regions 212 of FIG. 2 can also be initially displayed at a preset location such as within the middle of the original images 206.

The magnification regions 212 may also be not overlaid on the original images 206 initially to provide the user with an unobstructed view of the original images 206 while the user determines where to place the initial magnification. Once the display step 702 is complete, a processor of the magnification system 100 can execute a detect step 704.

The detect step 704 can implement a user interface such as the touchscreen display 202 to detect a positioning user input, the positioning user input identifying first coordinates for the first center point 220 of FIG. 2 of the first magnification region 214 of FIG. 2. The positioning user input can be a double tap, a single tap, a tap and drag, or even a pinch.

Additionally, input can be received via the display 202 indicating that the user is no longer touching the display 202 and, in response to receiving such input indicating that the user is no longer touching the touchscreen, a determination can be made as to whether one or more actions are associated with the selected content.

Once the detect step 704 is executed, processors within the magnification system 100 can execute a calculate step 706. The calculate step 706 can be executed to calculate second coordinates for the second center point 224 of FIG. 2 for the second magnification region 216 of FIG. 2 based on a linear relationship between the location of the first center point 220 within the first original image 208 of FIG. 2 and the location of the second center point 224 of the second magnification region 216 within the second original image 210 of FIG. 2.

Once the calculate step 706 has been executed, processors within the magnification system 100 can execute a position step 708 in which the second center point 224 of the second magnification region 216 can be displayed overlaid onto the second original image 210. Once the position step 708 has been executed, processors of the magnification system 100 can execute a move step 710.

The move step 710 can iterate through the detect step 704, the calculate step 706, and the position step 708 again in order to update the location of the magnification regions 212 within the original images 206 based on new user inputs.

Thus, it has been discovered that the magnification system furnishes important and heretofore unknown and unavailable solutions, capabilities, and functional aspects. The resulting configurations are straightforward, cost-effective, uncomplicated, highly versatile, accurate, sensitive, and effective, and can be implemented by adapting known components for ready, efficient, and economical manufacturing, application, and utilization.

While the magnification system has been described in conjunction with a specific best mode, it is to be understood that many alternatives, modifications, and variations will be apparent to those skilled in the art in light of the preceding description. Accordingly, it is intended to embrace all such alternatives, modifications, and variations, which fall within the scope of the included claims. All matters set forth herein or shown in the accompanying drawings are to be interpreted in an illustrative and non-limiting sense.

What is claimed is:

1. A method of operating an image magnification system comprising:
   displaying original images, the original images including a first original image and a second original image, the original images being visual depictions of a physical object based on raw data collected from an image sensor, the original images being displayed on a display;
   displaying magnification regions overlaid on top of the original images, the magnification regions including a first magnification region displayed overlaid on top of the first original image and having a first outline and a first center point, and the magnification regions including a second magnification region displayed overlaid on top of the second original image and having a second outline and a second center point;
   detecting a positioning user input, the positioning user input identifying first coordinates for the first center point;
   calculating second coordinates for the second center point based on a ratio between the location of the first center point within the first original image and the location of the second center point within the second original image, and wherein the ratio is a width of the second original image divided by a width of the first original image, a height of the second original image divided by a height of the first original image, or a combination thereof;
   displaying the second magnification region overlaid on the second original image and the second magnification region having the second center point based on the ratio; and
   displaying magnified images including a first magnified image corresponding to the first magnification region and a second magnified image corresponding to the second magnification region.

2. The method of claim 1 further comprising:
   displaying a context selection menu including a context request and remove context request;
   detecting a selection user input, the selection user input corresponding to either the context request or the remove context request;
   displaying a portion of the original image together with the magnified image, the portion of the original image being areas around the magnified region, and displaying the portion is based on the selection user input corresponding to the context request; and
   displaying the magnified images and removing the display of the original images based on the selection user input corresponding to the remove context request.

3. The method of claim 1 further comprising:
   displaying a view selection menu including a singular view request;
   detecting a selection user input corresponding to the singular view request; and
   displaying only one of the original images together with only one of the magnified images based on the selection user input corresponding to the singular view request.

4. The method of claim 1 further comprising:
   displaying a view selection menu including an unlink request;
   detecting a selection user input corresponding to the unlink request;
   detecting a modifying positioning user input identifying the second coordinates for the second center point; and
   displaying the second magnification region overlaid on the second original image and the second magnification region having the second center point based on the modifying positioning user input and independent of the ratio.

5. The method of claim 1 further comprising:
   detecting a sizing user input; and
   displaying the magnification regions with a different size based on the sizing user input.

6. The method of claim 1 further comprising calculating the first center point as Cartesian coordinates based on a lower left corner of the first original image aligned with an origin of a Cartesian coordinate grid.

7. The method of claim 1 further comprising:
   detecting a modifying positioning user input, the modifying positioning user input identifying modified first coordinates for the first center point;
   calculating the second coordinates for the second center point based on the ratio between the location of the modified first center point within the first original image and the location of the second center point within the second original image; and
   displaying the second magnification region overlaid on the second original image and the second magnification region having the second center point based on the ratio.

8. A non-transitory computer readable medium, useful in association with a processor, including instructions configured to:
  display original images, the original images including a first original image and a second original image, the original images being visual depictions of a physical object based on raw data collected from an image sensor, the original images being displayed on a display;
  display magnification regions overlaid on top of the original images, the magnification regions including a first magnification region displayed overlaid on top of the first original image and having a first outline and a first center point, and the magnification regions including a second magnification region displayed overlaid on top of the second original image and having a second outline and a second center point;
  detect a positioning user input, the positioning user input identifying first coordinates for the first center point;
  calculate second coordinates for the second center point based on a ratio between the location of the first center point within the first original image and the location of the second center point within the second original image, and wherein the ratio is a width of the second original image divided by a width of the first original image, a height of the second original image divided by a height of the first original image, or a combination thereof;
  display the second magnification region overlaid on the second original image and the second magnification region having the second center point based on the ratio; and
  display magnified images including a first magnified image corresponding to the first magnification region and a second magnified image corresponding to the second magnification region.

9. The non-transitory computer readable medium of claim 8 further comprising instructions configured to:
  display a context selection menu including a context request and remove context request;
  detect a selection user input, the selection user input corresponding to either the context request or the remove context request;
  display a portion of the original image together with the magnified image, the portion of the original image being areas around the magnified region, and displaying the portion is based on the selection user input corresponding to the context request; and
  display the magnified images and removing the display of the original images based on the selection user input corresponding to the remove context request.

10. The non-transitory computer readable medium of claim 8 further comprising instructions configured to:
  display a view selection menu including a singular view request;
  detect a selection user input corresponding to the singular view request; and
  display only one of the original images together with only one of the magnified images based on the selection user input corresponding to the singular view request.

11. The non-transitory computer readable medium of claim 8 further comprising instructions configured to:
  display a view selection menu including an unlink request;
  detect a selection user input corresponding to the unlink request;
  detect a modifying positioning user input identifying the second coordinates for the second center point; and
  display the second magnification region overlaid on the second original image and the second magnification region having the second center point based on the modifying positioning user input and independent of the ratio.

12. The non-transitory computer readable medium of claim 8 further comprising instructions configured to:
  detect a sizing user input; and
  display the magnification regions with a different size based on the sizing user input.

13. The non-transitory computer readable medium of claim 8 further comprising instructions configured to calculate the first center point as Cartesian coordinates based on a lower left corner of the first original image aligned with an origin of a Cartesian coordinate grid.

14. The non-transitory computer readable medium of claim 8 further comprising instructions configured to:
  detect a modifying positioning user input, the modifying positioning user input identifying modified first coordinates for the first center point;
  calculate the second coordinates for the second center point based on the ratio between the location of the modified first center point within the first original image and the location of the second center point within the second original image; and
  display the second magnification region overlaid on the second original image and the second magnification region having the second center point based on the ratio.

15. An image magnification system comprising:
  a display configured to:
    display original images, the original images including a first original image and a second original image, the original images being visual depictions of a physical object based on raw data collected from an image sensor, the original images being displayed on a display,
    display magnification regions overlaid on top of the original images, the magnification regions including a first magnification region displayed overlaid on top of the first original image and having a first outline and a first center point, and the magnification regions including a second magnification region displayed overlaid on top of the second original image and having a second outline and a second center point, and
    detect a positioning user input, the positioning user input identifying first coordinates for the first center point;
  a processor configured to calculate second coordinates for the second center point based on a ratio between the location of the first center point within the first original image and the location of the second center point within the second original image, and wherein the ratio is a width of the second original image divided by a width of the first original image, a height of the second original image divided by a height of the first original image, or a combination thereof; and
  wherein the display is configured to:
    display the second magnification region overlaid on the second original image and the second magnification region having the second center point based on the ratio, and
    display magnified images including a first magnified image corresponding to the first magnification region and a second magnified image corresponding to the second magnification region.

16. The system of claim 15 wherein the display is further configured to:
- display a context selection menu including a context request and remove context request;
- detect a selection user input, the selection user input corresponding to either the context request or the remove context request;
- display a portion of the original image together with the magnified image, the portion of the original image being areas around the magnified region, and displaying the portion is based on the selection user input corresponding to the context request; and
- display the magnified images and removing the display of the original images based on the selection user input corresponding to the remove context request.

17. The system of claim 15 wherein the display is further configured to:
- display a view selection menu including a singular view request;
- detect a selection user input corresponding to the singular view request; and
- display only one of the original images together with only one of the magnified images based on the selection user input corresponding to the singular view request.

18. The system of claim 15 wherein the display is further configured to:
- display a view selection menu including an unlink request;
- detect a selection user input corresponding to the unlink request;
- detect a modifying positioning user input identifying the second coordinates for the second center point; and
- display the second magnification region overlaid on the second original image and the second magnification region having the second center point based on the modifying positioning user input and independent of the ratio.

19. The system of claim 15 wherein the display is further configured to:
- detect a sizing user input; and
- display the magnification regions with a different size based on the sizing user input.

20. The system of claim 15 wherein the processor is further configured to calculate the first center point as Cartesian coordinates based on a lower left corner of the first original image aligned with an origin of a Cartesian coordinate grid.

* * * * *